United States Patent [19]
Campbell

[11] Patent Number: 5,283,074
[45] Date of Patent: Feb. 1, 1994

[54] METHOD OF MOVING DOUGH IN A DOUGH PROCESSING SYSTEM

[76] Inventor: Sterrett P. Campbell, 995 Peachtree Dunwoody Ct., Atlanta, Ga. 30328

[21] Appl. No.: 939,445

[22] Filed: Sep. 2, 1992

[51] Int. Cl.$^5$ .............................................. A21D 6/00
[52] U.S. Cl. ...................................... 426/496; 366/85; 425/208; 426/503
[58] Field of Search ............... 426/503, 504, 496, 516, 426/517, 518; 425/204, 208; 366/85, 86

[56] References Cited

U.S. PATENT DOCUMENTS

| | | | |
|---|---|---|---|
| 4,332,538 | 6/1982 | Campbell | 425/140 |
| 4,449,908 | 5/1984 | Campbell | 425/204 |
| 4,474,473 | 10/1984 | Higuchi et al. | 425/208 |
| 4,940,329 | 7/1990 | Dienst | 425/208 |
| 4,948,611 | 8/1990 | Cummins | 426/518 |

*Primary Examiner*—George Yeung
*Attorney, Agent, or Firm*—Hopkins & Thomas

[57] ABSTRACT

Baker's dough moves from feed hopper (21) through dough inlet opening (25) into auger housing (19). Reduced pressure is maintained in the auger housing by gas exhaust port (28) and vacuum pump (27). The depth and amplitude of the helical cavity (31) in the pumping section (34) of the auger (20) is greater than the depth and amplitude of the helical cavity (33) in the gas exhaust section (35) of the auger, so that more resistance is applied by the interior cylindrical surface (29) of the auger housing to the dough in the gas exhaust section (35) than in the pumping section (34). Therefore, the dough does not clog the gas exhaust port, allowing increased vacuum to be applied to the housing, thereby firmly drawing dough to the auger. Additionally, transverse dough feed and transverse dough exhaust with respect to length of the auger tends to reduce the tendency of the dough to move circumferentially with the rotation of the auger, thereby enhancing the pumping efficiency of the auger.

7 Claims, 1 Drawing Sheet

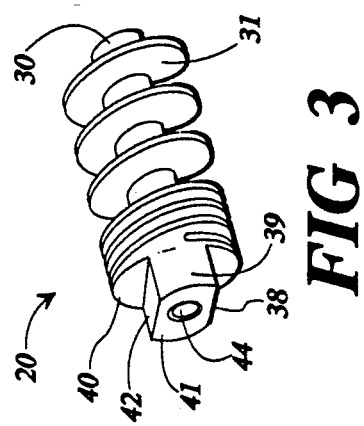
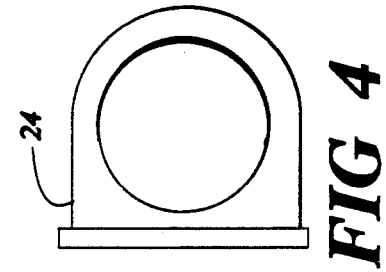
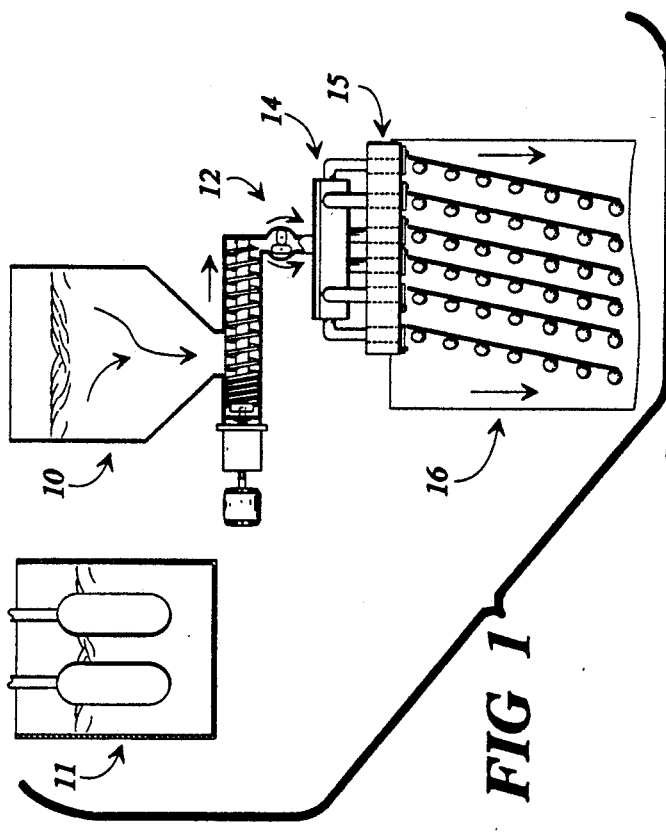
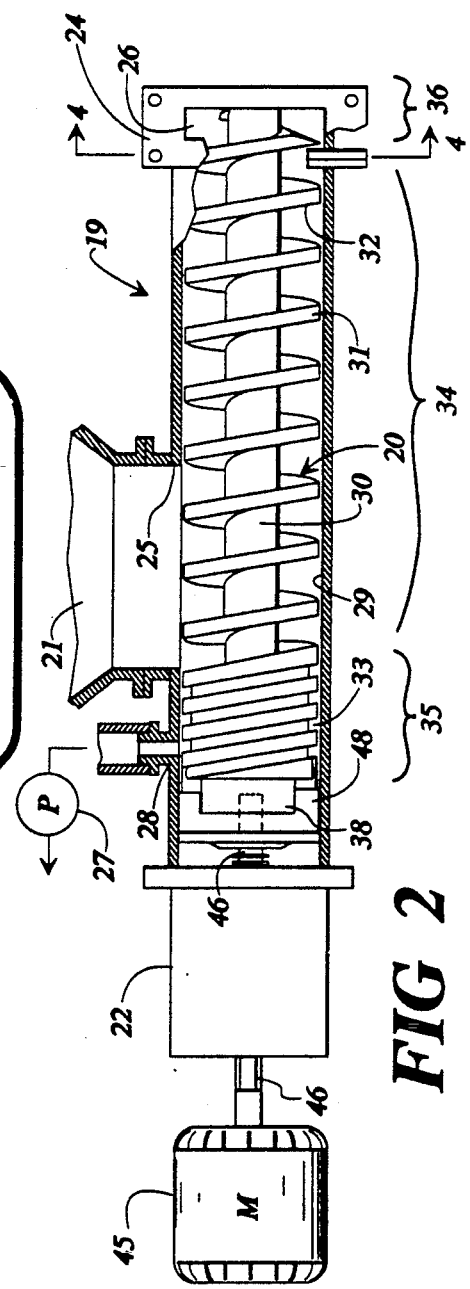

METHOD OF MOVING DOUGH IN A DOUGH PROCESSING SYSTEM

FIELD OF INVENTION

This invention relates to a method and apparatus for dispensing baker's dough and the like which is received in a batch from a mixer and which is to be transported in a continuous stream to, for example, a dough distribution manifold for subdividing into multiple streams of dough, and subsequently to a dough divider which forms the separate streams of dough into dough balls for further processing. More particularly, this invention relates to a stuffing pump which minimizes the disturbance of the gluten structure of the dough and which restores the dough to its mixer density during its pumping operation.

BACKGROUND OF THE INVENTION

When baker's dough is mixed, it is usually blended in a large mixer, and the batch of dough in the mixer must be transferred to a stuffing pump which forms the dough in a continuous stream and moves the dough through subsequent processing equipment such as a metering pump, and through a dough distribution manifold where the single stream of dough is divided into several streams of equal density, and then each stream is moved to a dough divider where each stream of dough is subdivided into dough balls, which after baking, become buns, etc.

The dividing process usually is carefully performed so that each biscuit, bun, etc. divided from the mass of dough is of consistent weight so that when the product is subsequently baked or otherwise cooked, packaged and delivered, each of the products will be of substantially uniform size, weight and density. Examples of equipment used to perform these functions are found in U.S. Pat. Nos. 4,332,538 and 4,449,908.

When dough has been mixed and is waiting to be divided into smaller biscuits, buns, etc., the dough tends to rise so that it becomes less dense and occupies a larger volume per unit of weight. Therefore, while the dough may be at optimum density when still in the mixer, a batch of dough that has been transported to the hopper of a stuffing pump tends to rise, and the batch of dough that is waiting to be handled by the stuffing pump and subsequent processing equipment is likely to be less dense than the first portion of the batch of dough that was processed. Since the equipment used for dividing dough functions to divide the dough into uniform volumes, the dividing equipment continues to form the dough balls with the same volume but with less weight of dough as the dough from the batch rises, causing the subsequent products to be different from those products made from the first dough taken from the batch. As this happens, the dough divider operator usually attempts to compensate for the less dense dough by adjusting the pump pressure, the divider volumetric measuring operation, etc., in an effort to cause the dough balls to be formed in larger volumes but of the same weight.

Attempts have been made to draw the gases from dough as the dough is moved by its stuffing pump toward the dough divider so as to return the dough to its desired mixer density. For example, U.S. Pat. No. 4,449,908 teaches the process of drawing a zone of reduced gas pressure about the dual auger screws of a stuffing pump, which tends to draw the dough into the stuffing pump and to expel gases from the dough which have been released because of the shearing and stretching of the dough. However, the stuffing pump uses interference fit augers with special shaped concave conveying surfaces in order to impart the high pressures to the dough that are necessary to achieve the high pressure and uniform dough product. Further, the shapes of the dual augers and auger housing limits the amount of negative gas pressure that can be applied to the system. If excess negative pressure is used, the dough tends to enter the gas exhaust system. Further, the gas exhaust system usually cannot be started upon start up of the augers, requiring a time delay to start the gas exhaust system.

Thus, it can be seen that it would be desirable to provide a baker's dough stuffing pump which is simple to operate, is of inexpensive construction, and which handles the dough with a minimum of shearing and stretching and disruption of the gluten structure of the dough and which returns the dough substantially to and maintains the dough at mixer density.

SUMMARY OF THE INVENTION

Briefly described, the present invention comprises a baker's dough stuffing pump which comprises an auger pump having a single auger extending longitudinally through the auger housing, with a dough inlet that feeds dough radially to the auger and a dough outlet that delivers dough radially from the auger, and with the inlet being of a size sufficient to feed dough across the full breath of the auger, and with an exhaust gas system which draws the gases from about the auger away from the dough movement at a pressure sufficient to return the dough to its original mixer density.

The driven end of the auger, remote from the delivery end thereof, includes a shallow thread design which is small enough to exclude the movement of dough therein, and large enough to permit the passage of gas. The gas exhaust system communicates with the smaller auger threads and applies a differential pressure within the auger housing of from 8 to 12 PSI. This reduced pressure tends to draw the baker's dough completely about the auger. Further, the radial inlet feed and the radial delivery of the dough presents a holding force to the dough in its spiral configuration wrapped around the auger so that the dough is more positively urged through the auger housing, minimizing the circumferential slippage of the dough with respect to the auger housing. This minimum of circumferential slippage, the complete filling of the dough about the auger and radial infeed and radial delivery minimize the turbulence of the dough as it moves through the auger housing, minimize the time spent by the dough in the housing and provide a reliable and more consistant through put rate plus the ability to develop higher dough pressure in the dough extending down stream from the stuffing pump should down stream restrictions require it.

The auger of the stuffing pump has a dough pumping section with relatively deep and wide spaces between the helical thread and a gas exhaust section that has relatively shallow and narrow spaces between the helical thread. A vacuum is applied to the gas exhaust section which causes a suction to be applied about the perimeter of the auger while the auger rotates to expel the dough in the opposite direction. The relatively shallow and narrow spaces between the helical groove at the gas exhaust section of the auger causes any dough that tends to move into the gas exhaust section to have relatively increased frictional contact with the auger housing per pound of dough, which means that more dough pumping energy is applied to the dough attempting to enter the gas exhaust section of the auger. This assures that the dough will not enter and clog the gas exhaust section of the auger. This results in the elimination of the requirement of a vacuum trap that is commonly used by the prior art degassing systems, and the absence of cleaning the vacuum trap and other related equipment.

Further, the use of a single auger as opposed dual augers in a vacuum auger system permits smaller degassing channels to be used which in turn allows more differential pressure to be applied to the dough, and therefore much high pressure differential to be applied to the dough at the entrance to the auger from the hopper, thus assuring that the dough is firmly urged by atmospheric pressure into engagement with the auger at the inlet of the pump. This firm engagement of the dough with the auger at the inlet of the pump in a radial direction with respect to the auger avoids excess circumferential slippage between the dough and the auger housing during the pumping function.

Further, the use of a single auger verses dual augers avoids the more difficult assembly and disassembly of the auger pump during cleaning of the augers and the auger housing.

Thus, it is an object of this invention to provide an improved system for dispensing baker's dough and similar viscous materials, which degasses the dough to a known and desired density, and which reliably dispenses the dough at predetermined pressures to subsequent dough processing stations.

It is another object of this invention to provide an improved method and apparatus for degassing baker's dough as the dough is passed from a hopper through a stuffing pump toward subsequent dough handling equipment.

A further object of the invention is to provide an improved dough stuffing pump which is inexpensive to produce, operate and clean, and that has improved degassing abilities.

Still another object of this invention is to provide an improved auger and auger housing design which enhances degassing of baker's dough in a stuffing pump and which improves the loading of baker's dough about the auger.

Other objects, features, and advantages of the present invention will become apparent upon reading the following specification, when taken in conjunction with the accompanying drawings.

BRIEF DESCRIPTION OF THE DRAWINGS

FIG. 1 is a schematic illustration of the dough processing system which includes the stuffing pump.

FIG. 2 is a side cross-sectional view of stuffing pump.

FIG. 3 is a perspective illustration of the driven end of the auger.

FIG. 4 is an end cross-sectional view of the dough outlet of the stuffing pump.

DETAILED DESCRIPTION

Referring now in more detail to the drawings, in which like numerals indicate like parts throughout the several views, FIG. 1 illustrates a baker's dough stuffing pump 10 which is positioned in a baker's dough processing system that includes, for example, a dough mixer 11, a metering pump 12, a dough distribution manifold 14, a dough divider 15, and a rounder bar conveyor 16. A disclosure of a prior art stuffing pump, distribution manifold, dough divider and rounder bar conveyor is found in U.S. Pat. No. 4,948,611.

As illustrated in FIG. 2, stuffing pump 10 includes auger housing 19, auger 20, and feed hopper 21. A bearing housing 22 is mounted to one end of auger housing 19 and dough outlet housing 24 is mounted to the other end of the auger housing.

Auger housing 19 defines a dough inlet opening 25 which directly communicates with feed hopper 21 and admits baker's dough intermediate the ends of the housing. The dough outlet housing 24 comprises a continuation of the auger housing and defines a dough outlet opening 26 that extends transversely to the length of the auger housing 19 for delivering dough to a metering pump, or other dough processing equipment downstream from the stuffing pump. A gas exhaust port 28 is formed at the other end of the housing and is arranged to communicate with a source of low gas pressure, such as with the inlet of a Venturi pump 27 which draws a zone of reduced gas pressure within the auger housing. The interior surface 29 of the auger housing 19 is substantially cylindrical for close spacing of the auger 20.

Auger 20 comprises shank 30 and a helical pumping thread 31 that is coiled around and surrounds shank 30 from end to end of the shank. Helical thread 31 defines a helical cavity 32 which receives dough from the hopper 21, and when the auger is rotated, the thread moves the dough from the dough inlet opening 25 to the dough outlet opening 26.

The auger 20 is formed in three sections, the pumping section 34 intermediate its ends, the gas exhaust section 35 at one end and the delivery section 36 at the other end. The helical thread 31 and shank 30 are of uniform shape and dimensions throughout the pumping section 34 and delivery section 36, so that the helical cavity 32 is relatively wide and deep in these two sections. However, in the gas exhaust section 35 the shank 30 is of larger diameter and the pitch of the helical thread 31 is smaller, causing the helical cavity 33 in the gas exhaust section to be shallower and shorter. Therefore, the amount of baker's dough accommodated in the helical cavity 32 of the pumping section and delivery section 36 is of larger volume than the amount of baker's dough that could be theoretically accommodated in the helical cavity 33 of the gas exhaust section 35. The gas exhaust port 28 communicates directly with the helical cavity 33 of the gas exhaust section 35 so that the helical cavity 33 is continuously is exposed to reduced gas pressure, and the reduced gas pressure in the gas exhaust section communicates through the helical cavity 33 with the pumping section 34 of the auger.

As illustrated in FIG. 3, the driven end 38 of auger 20 is formed with opposed semi-cylindrical perimeter surfaces 39 and intermediate opposed slots 40 which form an approximately rectangular drive block 41 having opposed flat driving surfaces 42. A central cavity 44 is formed in the drive block 41.

Motor 45 has its driven shaft connected to the drive shaft 46, and the drive shaft 46 extends through bearing housing 22 and into the housing 19 of the stuffing pump. Mounted on the end of drive shaft 46 is drive block 48 that is shaped to mate with the driven end 38 of auger 20 so as to impart rotary motion to auger 20. It will be noted that drive block 48 functions to rotate drive block 41 of the auger substantially over the full diameter of the auger, so as to apply drive forces at the perimeter of the auger in line with the helical thread 31 of the auger, substantially without requiring the shank to apply the total driving forces to the helical thread.

Dough inlet opening 25 formed in housing 19 is of a length and width so as to provide a broad presentation of dough to the helical thread 31 of the auger. For example, if the outside diameter of the auger is 8 inches, both the length of width of the dough inlet opening 25 will be 8 inches, providing 64 square inches of dough exposure to the auger. This assures that a sufficient amount of dough will be presented to the auger in order to completely surround the auger with dough.

In the meantime, gas is exhausted through gas exhaust port 28 from the gas exhaust section 35 of the auger. This reduced air pressure within the auger housing 19 firmly draws the dough into the auger housing and causes the dough to completely surround auger 20 and to fill the helical cavity 32 in the pumping section 34 of the auger. As the auger rotates, the dough tends to be carried circumferentially by the auger; however, the frictional contact of the dough at the surface of the auger with the interior cylindrical surface 29 of the auger housing presents a resistance to the circumferential movement of the dough, causing the dough to slide with respect to the helical thread 31 of the auger. This causes the dough to move axially along the length of the auger from the dough inlet opening 25 to the dough outlet opening 26. With the negative gas pressure used to draw the dough into and fill the auger, the dough will always contact the inner cylindrical surface 29 of the auger housing so as to enhance the longitudinal movement of the dough.

In addition to the resistance to circumferential movement of the dough presented by the interior cylindrical surface 29 of the auger housing, the transverse or radial entry movement of the dough from hopper 21 through dough inlet opening 25 into the auger housing 19 also assists in resisting circumferential movement of the dough with the auger, requiring the dough to move axially through the auger housing. Further, since the dough outlet opening 26 extends transversely with respect to the length of the auger 20, the dough is expelled transversely out of the auger. Again, the transverse movement as opposed to axial movement of the dough leaving the auger resists the tendency of the dough to move circumferentially with the auger.

Since the helical cavity 33 in the gas exhaust 35 is shallower than the helical cavity 32 in the pumping section 34, it will be noted that per unit volume of dough in the helical cavities, any dough that might be present in smaller helical cavity 33 of the gas exhaust section 35 will experience more resistance by engagement with the interior cylindrical surface 29 of the housing 19 than the dough in the larger helical cavity 32 of the pumping section 34. Further, the small size of the helical cavity 33 makes it difficult for dough to enter the cavity. Therefore, an increased pumping force will be applied by the auger 20 to any dough in the gas exhaust section 35. Further, when the reduced gas pressure is applied through gas exhaust port 28 to the gas exhaust section 35, the dough moving from the inlet opening 25 to the outlet opening 26 will not enter the smaller helical cavity 33. Therefore, increased negative pressure can be applied to the auger 20, resulting in increased degassing of the dough, and improved movement of the dough from the hopper 21 to the flights of the auger so as to completely fill the helical cavity 32 of the auger.

For example, the negative pressure differential of 10 pounds per square inch can be applied to the gas exhaust port 28. This results in approximately 10 pounds per square inch force being applied to the dough in the hopper 21, urging the dough through the dough inlet opening 25. With an 8 inches by 8 inches dough inlet opening up to 640 pounds of force urges the dough against the auger 20. This broad application of dough through the enlarged opening and the increased force pushing the dough against the hopper substantially avoids any circumferential movement of the dough in response to the rotation of the auger, resulting in less dwell time of the dough in the stuffing pump and more uniform control of the pressure of the dough at the outlet opening 26.

The bearing housing 22 is adjacent the auger housing 19 and the bearing housing includes vacuum seals about the drive shaft so that the reduced gas pressure within the auger housing does not draw fluids from the bearing housing into the auger housing.

Although the invention has been described as a stuffing pump for baker's dough, the invention can be used as a transfer pump, an extrusion pump, or for the purpose of moving other types of viscous materials. Further, while the invention described in the foregoing specification and as illustrated in the drawings describes in detail the stuffing pump, it will be understood by those skilled in the art that variations and modifications thereof can be made without departing from the spirit and scope of the invention as defined by the following claims.

I claim:

1. A method of moving baker's dough in a dough processing system toward subsequent dough processing equipment comprising the steps of:
    feeding dough radially to an auger intermediate the ends of the auger;
    rotating the auger to move the dough in a helical stream along the length of the auger;
    delivering the dough from the helical stream in a direction transverse of the length of the auger; and
    exhausting air from the dough in a direction generally opposite to the direction of movement of the helical stream of dough.

2. The method of claim 1 and wherein the step of exhausting gas from the dough comprises drawing a zone of reduced gas pressure about one end of the auger.

3. The method of claim 1 and wherein the step of rotating the auger comprises driving one end of the auger at its periphery.

4. The method of claim 1 and wherein the step of exhausting gas from the dough comprises reducing the pressure at the auger enough to draw the dough completely about the auger.

5. A method of moving baker's dough in a stuffing pump toward subsequent dough processing equipment comprising the steps of:
    transferring dough from a mixer to a hopper;
    feeding dough from the hopper radially into the helical thread of an auger of an auger pump;
    rotating the auger and moving the dough first along the length of the auger and then away from the auger in a direction transverse to the length of the auger;
    exhausting gas from about the auger in a direction generally opposite to the movement of the dough through the auger pump.

6. The method of claim 5 and wherein the step of exhausting gas from the auger pump comprises exhausting gas from about the auger of the auger pump with a pressure differential sufficient to draw the dough completely about the auger of the auger pump.

7. The method of claim 5 and wherein the step of exhausting gas from the auger pump comprises inducing gas to flow through a helical cavity of the auger which is shallower than the helical cavity of the auger that moves the dough.

* * * * *